(12) United States Patent
Choi et al.

(10) Patent No.: US 8,696,258 B2
(45) Date of Patent: Apr. 15, 2014

(54) CUTTING TOOL AND CARTRIDGE FOR THE SAME

(75) Inventors: Chang Hee Choi, Daegu (KR); Chang Gyu Park, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 274 days.

(21) Appl. No.: 12/997,542

(22) PCT Filed: Jun. 13, 2008

(86) PCT No.: PCT/KR2008/003350
§ 371 (c)(1),
(2), (4) Date: Dec. 10, 2010

(87) PCT Pub. No.: WO2009/151168
PCT Pub. Date: Dec. 17, 2009

(65) Prior Publication Data
US 2011/0097165 A1    Apr. 28, 2011

(51) Int. Cl.
*B23C 5/22* (2006.01)

(52) U.S. Cl.
USPC .......................................... 407/46; 407/101

(58) Field of Classification Search
USPC ................... 407/46, 47, 40, 101, 45, 51, 102
See application file for complete search history.

(56) References Cited

U.S. PATENT DOCUMENTS

| | | | | |
|---|---|---|---|---|
| 447,900 A | * | 3/1891 | Pallen | 407/45 |
| 3,059,316 A | * | 10/1962 | Berry, Jr. et al. | 407/101 |
| 3,163,919 A | * | 1/1965 | Turner | 407/38 |
| 3,408,722 A | | 11/1968 | Berry | |
| 4,318,647 A | * | 3/1982 | Erkfritz | 408/153 |
| 5,395,186 A | | 3/1995 | Qvart | |
| 5,800,079 A | * | 9/1998 | Qvarth | 407/46 |
| 6,058,989 A | * | 5/2000 | LaGrange et al. | 144/218 |
| 6,086,290 A | * | 7/2000 | Qvarth et al. | 407/38 |

(Continued)

FOREIGN PATENT DOCUMENTS

| | | |
|---|---|---|
| EP | 0 873 808 | 10/1998 |
| FR | 2894858 A1 | 6/2007 |

(Continued)

OTHER PUBLICATIONS

Decision on Grant date Apr. 25, 2012 issued in Russian counterpart application (No. 2011100848).

(Continued)

*Primary Examiner* — Daniel Howell
*Assistant Examiner* — Brendan Ayer
(74) *Attorney, Agent, or Firm* — Womble Carlyle

(57) ABSTRACT

A cutting tool for machining metallic materials has at least one cutting portion having a cartridge and a cartridge pocket for mounting cutting inserts to the cutting tool. The cartridge pocket has a top surface, a rear supporting surface and a bottom supporting surface. The top surface of the cartridge pocket has one or more serrated projecting portions. The cartridge has an insert pocket, a top surface, a first side surface and a bottom surface. The insert pocket of the cartridge receives a cutting insert. The top surface of the cartridge has one or more outwardly sloped surfaces and one or more inwardly sloped surfaces. The outwardly sloped surfaces mate with the serrated projecting portions. The inwardly sloped surfaces have a gap with respect to the projecting portions of the cartridge pocket.

16 Claims, 11 Drawing Sheets

(56) References Cited

U.S. PATENT DOCUMENTS

| | | | |
|---|---|---|---|
| 6,325,574 B1 * | 12/2001 | Treige | 407/35 |
| 6,334,740 B1 | 1/2002 | Qvarth | |
| 6,921,234 B2 | 7/2005 | Arvidsson et al. | |
| 6,971,823 B2 | 12/2005 | Satran et al. | |
| 7,118,311 B2 * | 10/2006 | Astrom | 407/46 |
| 7,549,358 B2 | 6/2009 | Pantzar | |
| 2004/0161311 A1 | 8/2004 | Satran et al. | |
| 2005/0232712 A1 | 10/2005 | Hecht | |
| 2007/0256287 A1 * | 11/2007 | Kocherovsky et al. | 29/428 |
| 2009/0196701 A1 * | 8/2009 | Wihlborg et al. | 408/230 |
| 2011/0188951 A1 * | 8/2011 | Mergenthaler | 407/44 |

FOREIGN PATENT DOCUMENTS

| | | |
|---|---|---|
| KR | 10-2003-0062746 | 7/2003 |
| RU | 2014177 C1 | 6/1994 |
| RU | 2283731 C1 | 9/2006 |
| SU | 1194601 A | 11/1985 |
| SU | 1645076 A1 | 4/1991 |
| WO | WO 01/54848 A1 | 8/2001 |
| WO | 03/045621 | 6/2003 |
| WO | 2004/033137 | 4/2004 |

OTHER PUBLICATIONS

Official Action dated May 10, 2012 issued in Korean counterpart application (No. 10 2010 7026106).
Extended Search Report dated May 14, 2012 issued in European counterpart application (No. 08766312.6).
International Search Report in PCT/KR2008/003350, dated Mar. 13, 2009.
Written Opinion in PCT/KR2008/003350, dated Mar. 13, 2009.
Patent publication dated Feb. 27, 2013 issued in Chinese counterpart application (No. CN102056695B).

* cited by examiner

CUTTING TOOL AND CARTRIDGE FOR THE SAME

RELATED APPLICATIONS

This is a 35 USC 371 U.S. National Phase of International Application No. PCT/KR2008/003350, filed 13 Jun. 2008 and published in English as WO 2009/151168A1 on 17 Dec. 2009. The contents of the aforementioned international application are incorporated by reference in their entirety.

TECHNICAL FIELD

The present invention relates to a cutting tool for machining metallic materials and a cartridge of a cutting tool for mounting cutting inserts to the cutting tool.

BACKGROUND ART

Conventional cutting tools with cartridges, which are adapted to mount cutting inserts, employ various means for securing the cartridges to the cutter body. In some cutting tools, threaded bores are provided in the cutter body and corresponding through bores are provided in the cartridges. The cartridges are secured directly to the cutter body by using screws. Such a method, however, requires various metal cutting operations for producing the threaded bores, which may weaken the cutter body. Further, when the cutting tool is damaged, the part of the screw that breaks off may fall into the threaded bore of the cutter body.

Other conventional cutting tools adopt a structure of securing the cartridge by means of a wedge. Korean Patent Application Laid-Open No. 2005-49530 discloses a cutting tool including cartridges with wedges and serrations. FIG. 1 illustrates a cutting tool according to such prior art. A cutter body 1 is plate-shaped and comprises a plurality of recesses 2. The recesses 2 are arranged at the same interval around its outer circumference. Each of the recesses 2 receives a cartridge 4 for mounting a cutting insert 3. When a screw 6 is fastened into a threaded hole 5 in the cutter body, the outer portion of the screw 6 is received in the recess 2. The position of the cartridge 4 may be finely adjusted in the axial direction of the cutter body as the screw rotates. Once the position of the cartridge 4 is determined, the cartridge is clamped through tightening a wedge 8 by a screw 7.

In the prior art as discussed above, the radial position of the cartridge is determined by serrations 9 on the bottom surface of the cartridge. Further, there is a gap between the inner side surface of the cartridge in the radial direction and the inner side surface of the cutter body, which receives the cartridge. Without such a gap, there may be interference between the two parts, i.e., the cartridge and the body of the cutting tool. Accordingly, the cartridge is supported only by top and bottom surfaces, and there is no support in the radial direction. That is, such a structure of the prior art may not provide a sufficient clamping force for the cartridge.

Further, as the serrations 9 become the reference position for mounting, the manufacture of the cartridges 4 becomes difficult. Also, the radial position of the cartridges after adjustment becomes inconsistent due to manufacturing and assembling errors of the serrations 9. As a result, the accuracy in the cutting processes is significantly deteriorated.

SUMMARY OF THE INVENTION

The objective of the present invention is to provide a cartridge, which overcomes or remarkably reduces the above disadvantages, and a cutting tool for such a cartridge.

In order to achieve the above objective, the present invention provides a cutting tool with one or more cutting portions. Each of the one or more cutting portions have a cartridge and a cartridge pocket. The cartridge pocket is formed on a body of the cutting tool for mounting the cartridge. The cartridge pocket includes a top surface, a rear supporting surface and a bottom supporting surface. The top surface has one or more projecting portions with serrations. The cartridge has an insert pocket, a top surface, a first side surface and a bottom surface. The insert pocket of the cartridge receives a cutting insert. The top surface of the cartridge mates with one or more projecting portions with serrations of the cartridge pocket. The first side surface of the cartridge mates with the rear supporting surface of the cartridge pocket. The bottom surface of the cartridge mates with the bottom supporting surface of the cartridge pocket. The top surface of the cartridge comprises one or more outwardly sloped surfaces and one or more inwardly sloped surfaces. The outwardly sloped surfaces mates with the projecting portions of the cartridge pocket. The inwardly sloped surfaces have a gap with respect to the projecting portions of the cartridge pocket.

According to the present invention, an upper portion of the top surface of the cartridge pocket comprises a threaded hole and a slot. The threaded hole is integrally formed in the cutting tool. The slot is formed along the threaded hole.

According to the present invention, the projecting portions of the cartridge pocket comprise a first saw tooth and a plurality of second saw teeth. The first saw tooth is located at the outer side of the cartridge pocket. The second saw tooth is located at the inner side of the first saw tooth. The second saw tooth has a slope different from that of the first saw tooth.

According to the present invention, an inwardly sloped surface of the first saw tooth located at the top surface of the cartridge pocket forms an angle in the range of 0° to 15° with respect to the bottom supporting surface of the cartridge pocket. Further, an inwardly sloped surface of the second saw tooth located at the top surface of the cartridge pocket forms an angle in the range of 30° to 45° with respect to the bottom supporting surface of the cartridge pocket.

According to the present invention, the bottom surface of the cartridge comprises a first flat surface, a second flat surface and a recess. The second flat surface mates with the bottom supporting surface of the cartridge pocket. The recess is located between the first and second flat surfaces. A screw is mounted in the recess. The screw is able to slidably adjust the cartridge.

According to the present invention, the cartridge comprises a first supporting wall and a second supporting wall. The first supporting wall is located between the top surface of the cartridge and the insert pocket for supporting the cutting insert. The second supporting wall is located on one side of the insert pocket in the axial direction of the cutting tool.

According to the present invention, a cartridge mounted in a cartridge pocket provided in a cutting tool comprises an insert pocket, a top surface, a first side surface, a second side surface and a bottom surface. The insert pocket is located at an outer portion of the cartridge pocket of the cutting tool for mounting a cutting insert. The top surface has projecting portions with serrations for mating with a top surface of the cartridge pocket. The first side surface mates with a rear supporting surface of the cartridge pocket. The second side surface is located at an outer portion of the cartridge pocket. The bottom surface mates with a bottom supporting surface of the cartridge pocket. The projecting portions with serrations of the cartridge pocket comprise a first saw tooth and a plurality of second saw teeth. The first saw tooth is located in the direction of said second side surface. The second saw teeth are located between the first saw tooth and the first side surface. The second saw teeth have a slope angle different from that of the first saw tooth.

According to the present invention, an outwardly sloped surface of the first saw tooth located at the top surface of the cartridge forms an angle in the range of 0° to 15° with respect to the bottom surface of the cartridge. Further, an outwardly sloped surface of the second saw tooth located at the top surface of the cartridge forms an angle in the range of 30° to 45° with respect to the bottom surface of the cartridge.

According to the present invention, a cartridge, which is adapted to mount cutting inserts, is supported by three surfaces (i.e., a top surface, a bottom surface and a first side surface), thereby allowing a more stable mount and providing sufficient fastening forces when compared to a prior art cartridge using serrations formed on the bottom surface thereof.

Further, according to the present invention, a cartridge can be stably mounted with only few parts when compared to the prior art using wedges.

Furthermore, according to the present invention, the position of a cutting edge can be easily and precisely adjusted by means of a screw adjusting cutter width.

In addition, according to the present invention, since a first side surface of the cartridge closely contacts the cartridge pocket to serve as a reference surface, it is easy to control the position of a cutting edge as it is fixed. Thus, the accuracy in cutting process can be significantly enhanced.

DETAILED DESCRIPTION

The present invention will be hereinafter described in detail with reference to the accompanying drawings.

Figure 2:
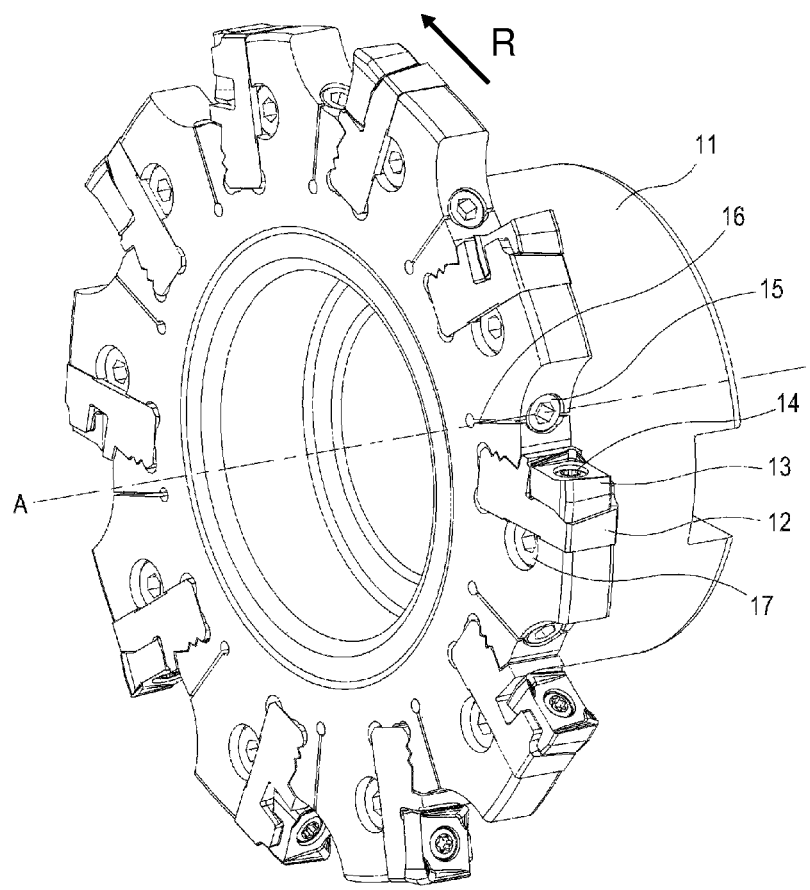
FIG. 2 is a perspective view of a cutting tool according to an embodiment of the present invention.

FIG. 2 is a perspective view of a cutting tool according to an embodiment of the present invention. The tool has a direction of rotation indicated by "R". A plurality of recesses or cartridge pockets for receiving a cartridge 12 are formed on a cutter body 11 along the outer periphery of the cutter body. A cutting insert 13 is fixed on the cartridge 12 by a screw 14.

Further, the cartridge 12 is secured to the cutter body 11 by a screw 15. A slot 16 is formed between the screw 15 and the cartridge pocket to facilitate the assembly of the cartridge 12. A screw 17 for adjusting a width of the cutter is inserted between the cutter body and a bottom surface of the cartridge. The cartridge can move in an axial direction A of the cutting tool as the screw 17 rotates. The term "axial direction" of the cutting tool as used herein means a direction denoted by "A" in FIG. 2. Further, the term "radial direction" as used herein means a direction from a center of the cutter body toward the outer periphery thereof.

On the cartridge, left-handed and right-handed cutting inserts may be arranged in an alternate manner. Thus, it is possible to machine grooves with various thicknesses by adjusting the screw for adjusting the width of a cutter.

Figure 3:
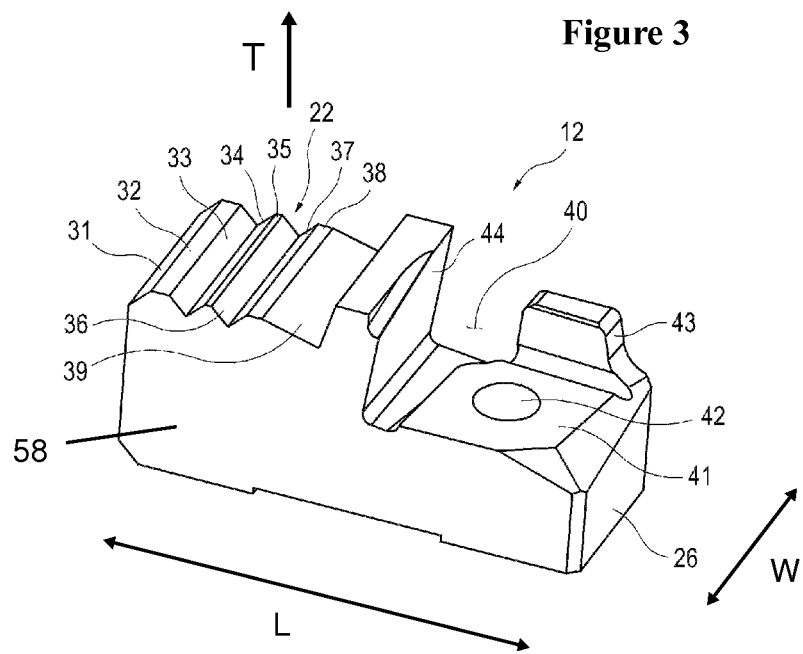
FIGS. 3 and 4 are perspective views of the cartridge according to the present invention.
Figure 4:
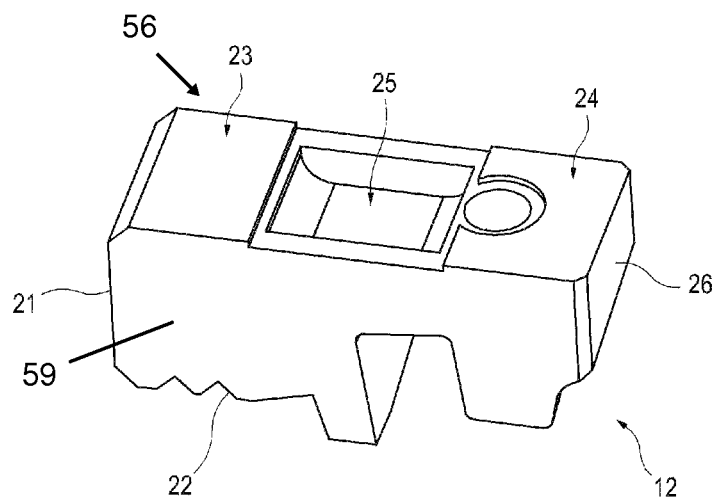
Figure 12:
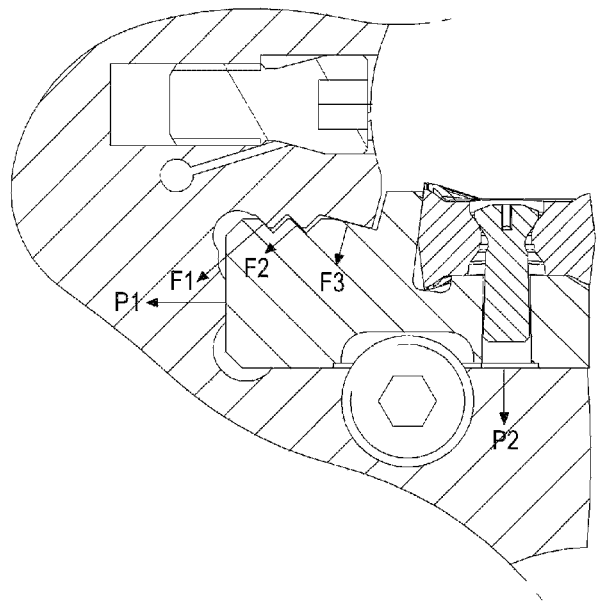
FIG. 12 shows supporting forces of the cartridge according to the present invention.

FIGS. 3 and 4 are perspective views of the cartridge 12 according to the present invention. The cartridge 12 comprises an inner side surface 21 (inner abutment side surface) in the radial direction, a top surface 22 (top abutment surface), a bottom surface 56 comprising two flat surfaces 23, 24 (bottom abutment surfaces) and one recess 25, an outer side surface 26 (outer non-abutment side surface) in the radial direction, a first lateral side surface 58, a second lateral side surface 59 and an insert pocket 40 formed on the top surface 22, proximate the outer side surface 26. The inner and outer side surfaces 21, 26 are spaced apart from one another along a length direction L of the cartridge, while the first and second lateral side surfaces 58, 59 are spaced apart from one another along a width direction W of the cartridge. The first and second lateral side surfaces 58, 59 connect the inner and outer side surfaces 21, 26 and the top and bottom surfaces 22, 56 are connected by the inner and outer side surfaces 21, 26 and the first and second lateral side surfaces 58, 59. The top surface 22 faces in a first general direction T and the insert 40 pocket is open to the same first general direction T in which the top surface 22 faces. The inner side surface 21 mates with a center portion of the cutter body. The top surface 22 comprises a serrated projecting portion between the insert pocket 40 and the inner side surface 21. The two flat surfaces 23, 24 and one recess 25 are formed on a bottom surface of the cartridge. The outer side surface 26 is located opposite to the center of the cutter body. The cutting insert is mounted on the insert pocket 40. The insert pocket 40 comprises a seating surface 41, a hole 42 and first and second supporting walls 43, 44. A screw is mounted to the hole 42 for fastening the insert. The seating surface 41 for a left-handed or right-handed cutting insert is different to prevent an incorrect mounting of the cutting insert. The top surface 22 of the cartridge comprises at least one serrated projecting portions. In the embodiments of the present invention, the cartridge has three serrated projecting portions. However, the number of serrated projecting portions should not be limited thereto. The serrated projection portions are spaced apart from one another along the length direction L of the cartridge. Each of the serrated projecting portions extends in the width direction W of the cartridge, from the first lateral side surface 58 to the second lateral side surface 59. Each of the serrated projecting portions comprises inwardly sloped surfaces 31, 34, 37 in the radial direction, upper chamfered surfaces 32, 35, 38, and outwardly sloped surfaces 33, 36, 39 in the radial direction. As shown in FIG. 12, when the cartridge is mounted within the cartridge pocket by screw, only the outwardly sloped surfaces 33, 36, 39 among the surfaces of the three serrated projecting portions formed on the top surface of the cartridge contact the cartridge pocket. That is, the cartridge contacts the cartridge pocket on at least one surface among the three surfaces of the serrated projecting portions while maintaining gaps at other non-contacting surfaces. Thus, a complete surface-contact at the radially inner side surface 21 and the bottom surfaces 23, 24 of the cartridge is guaranteed. According to the present invention, the first outwardly sloped surface 33 and the second outwardly sloped surface 36 among the outwardly sloped surfaces 33, 36, 39 form an angle of 45° with respect to the bottom surface 23, 24 of the cartridge. The third outwardly sloped surface 39 forms an angle of 15° with respect to the bottom surface 23, 24 of the cartridge. Preferably, the first and second outwardly sloped surfaces 33, 36 form an angle in the range of 30° to 45° with respect to the bottom surface 23, 24 of the cartridge. When the angle is less than 30°, the cartridge fails to closely contact in a radially inward direction. Thus, the cartridge can easily escape from the cartridge pocket during a rotation of the cutting tool. When the angle is more than 45°, a contact to the top surface of the cartridge pocket by the threaded hole and the slot may not be properly made.

Figure 5:
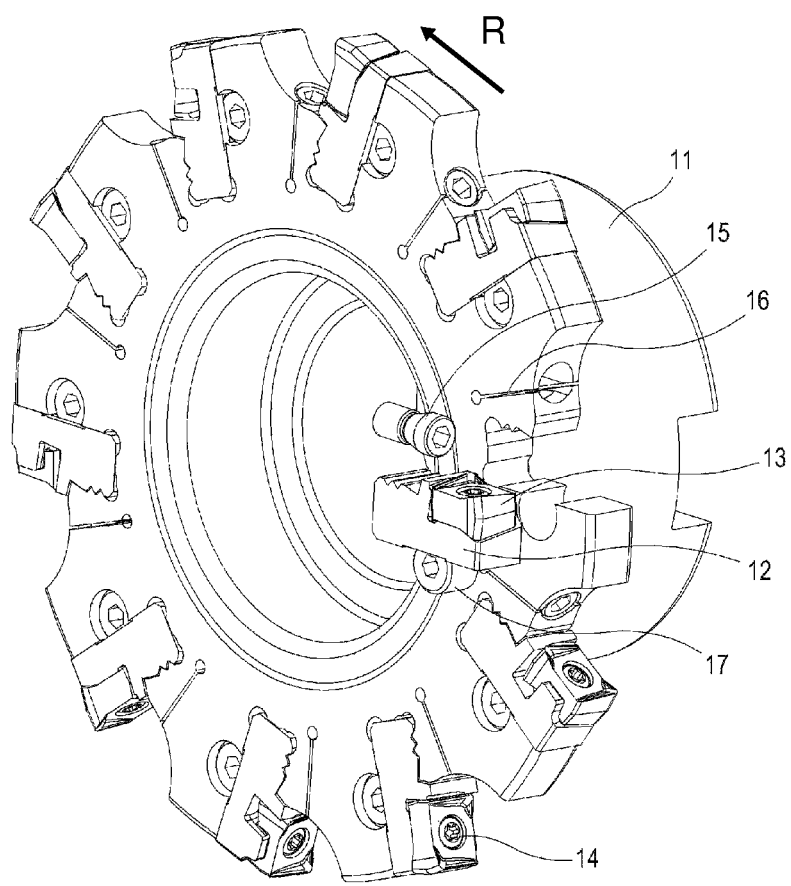
FIG. 5 is a perspective view showing the cutter body before the cartridge is mounted thereto.
Figure 6:
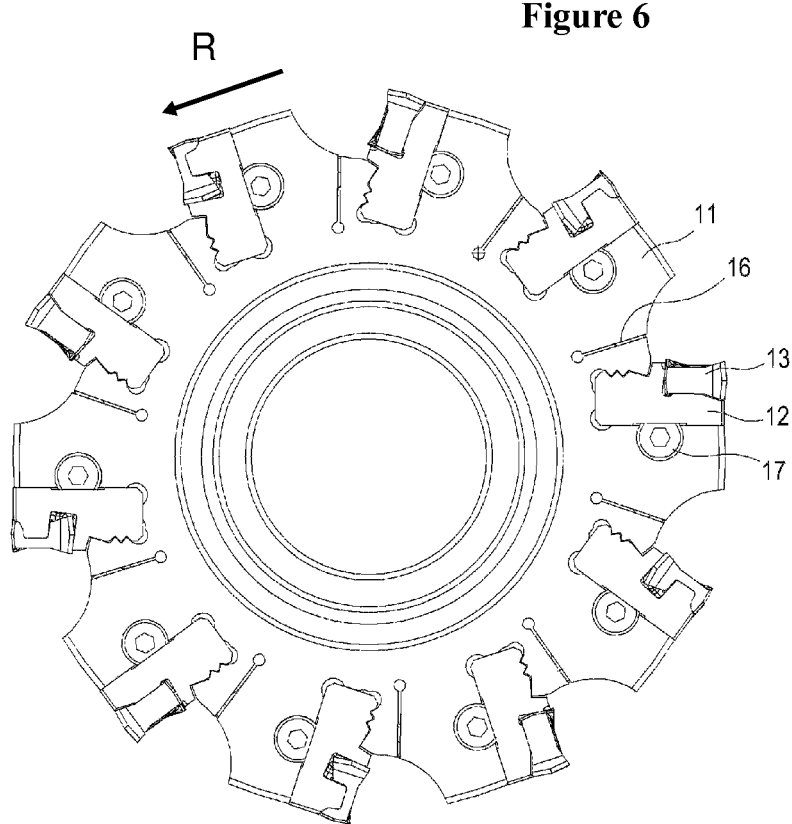
FIG. 6 is a front view of the cutter body with all parts mounted thereto.

FIG. 5 is a perspective view showing the cutter body before the cartridge is mounted thereto. As can be best seen in FIG. 4, the cartridge has the recess 25 at its bottom surface for receiving the screw 17 for adjusting the width of the cutter. The cartridge 12 can slide on the flat surfaces of the cartridge pocket as the screw 17 rotates. The cutting insert 13 may be assembled and disassembled at any time before or after mounting the cartridge. When the cartridge 12 is placed in a desired position, the cartridge is secured by means of the screw 15. FIG. 6 is a front view of the cutter body with all parts mounted thereto according to the present invention.

Figure 7:
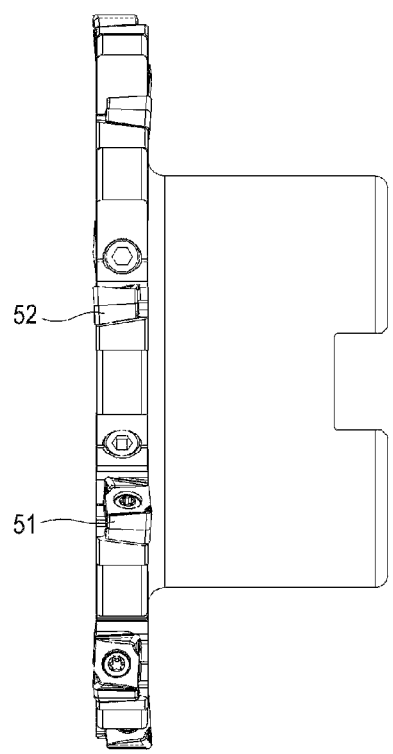
FIG. 7 is a side view of the cutter body according to the present invention.

FIG. 7 is a side view of the cutter body according to the present invention. As shown in FIG. 7, the left-handed cutting insert 51 and the right-handed cutting insert 52 may be alternately arranged on the cutter body of the present invention. Such an arrangement allows for groove machining. Further, it is possible to machine grooves with various thicknesses by adjusting the screw 17 for adjusting the width of the cutter.

Figure 8:
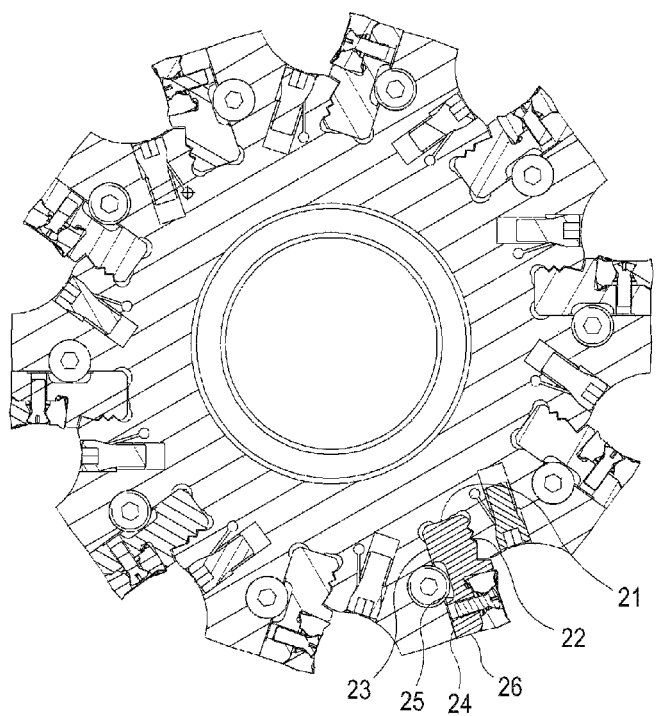
FIG. 8 is a cross-sectional view taken at the center of the cutter width of the cutter body according to the present invention.

FIG. 8 is a cross-sectional view taken at the center of the cutter width of the cutter body according to the present invention. As shown in FIG. 8, the cartridge is secured to the cutter body by contacting the cartridge pocket at the first and second flat surfaces 23, 24, the radially inner side surface 21 and the serrated top surface 22.

Figure 9:
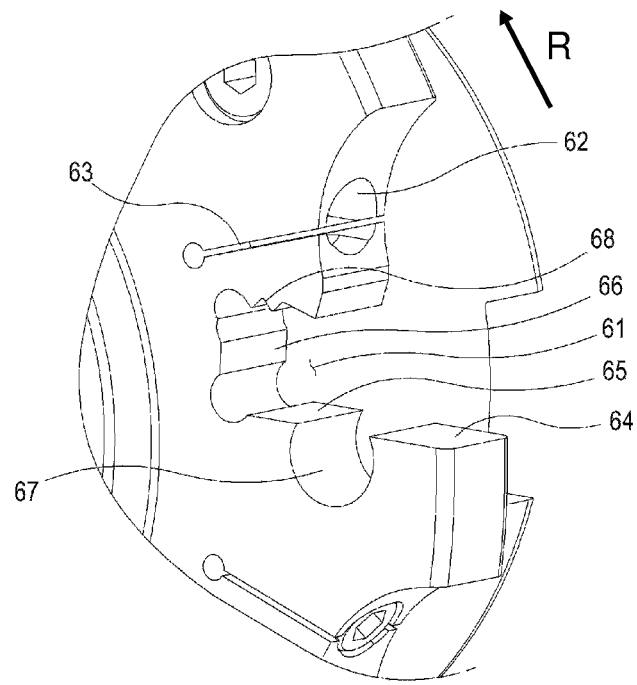
FIG. 9 is an enlarged view of the cartridge pocket before the cartridge is mounted to the cutter body according to the present invention.
Figure 10:
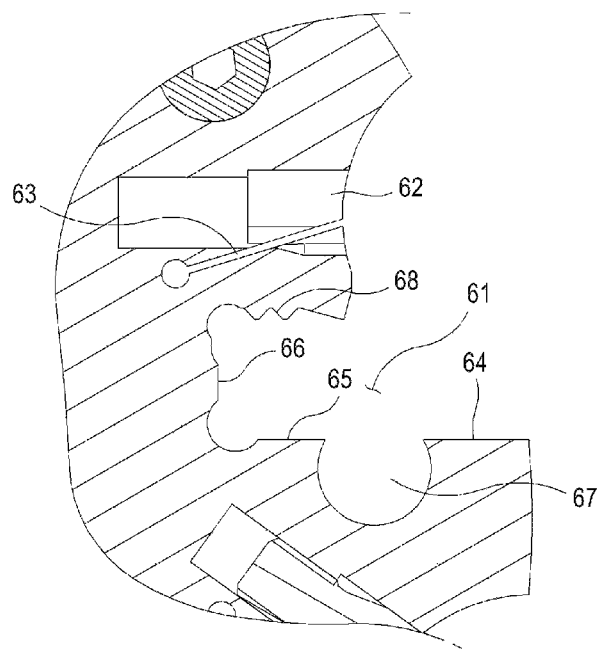
FIG. 10 is a cross-sectional view around the cartridge pocket before the cartridge is mounted to the cutter body according to the present invention.

FIGS. 9 and 10 show the cartridge pocket 61 before the cartridge is mounted to the cutter body according to the present invention. A hole 62 and a slot 63 are provided at an upper side of the cartridge pocket 61, in which the cartridge is seated. A screw for mounting the cartridge is inserted into the hole 62. The cartridge pocket comprises two flat bottom supporting surfaces 64, 65 and a rear supporting surface 66 on which the cartridge is seated. In the cartridge pocket 61 according to the present invention, the bottom supporting surfaces 64, 65 generally face in the direction of rotation R and the rear supporting surface 66 forms a right angle with respect to the bottom supporting surfaces 64, 65. A threaded hole 67, to which the screw for adjusting the width of the cutter is fastened, is formed between the two flat bottom surfaces 64, 65. A top surface 68 with one or more serrated projecting portions is formed at an upper side of the cartridge pocket. As the cartridge is secured by the screw for securing the cartridge after the cartridge is mounted, the serrated top surface of the cartridge pocket presses the cartridge.

Figure 11:
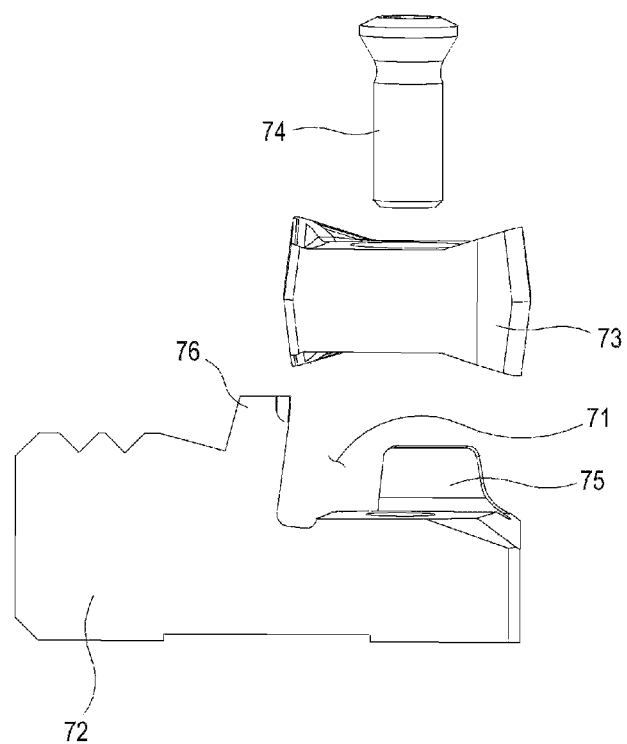
FIG. 11 illustrates a cutting insert mounted to the cartridge according to the present invention.

FIG. 11 is illustrates the mounting of the cutting insert 73 to the cartridge 72 according to the present invention. The cutting insert is mounted to the insert pocket 71 of the cartridge by a screw 74. First and second supporting walls 75, 76 are formed in the insert pocket 71 to divisionally support a load to the screw 74 caused by a cutting force, which is generated by contacting the workpiece during the cutting operation.

FIG. 12 shows supporting forces of the cartridge according to the present invention. Fastening forces F1, F2, F3, which are generated at the top surface of cartridge, produce a component force P1 perpendicular to the inner side surface of the cartridge and a component force P2 perpendicular to the bottom surface of the cartridge. The component force P1 brings the cartridge into close contact with an inside of the cutter body to prevent the cartridge from being removed due to a centrifugal force during a rotation of the cutting tool. The component force P2 brings the bottom surface of the cartridge into close contact with the bottom surface of the cartridge pocket. As such, the cartridge according to the present invention is supported by three surfaces of the cartridge (i.e., the top surface, the bottom surface and the radially inner side surface). Thus, the present invention allows a more stable mount and provides sufficient fastening forces when compared to the prior art using serrations formed on the bottom surface of the cartridge, as shown in FIG. 1.

While the cartridge according to the present invention has the fastening forces F1 and F2 with the same orientation, the fastening forces F1, F2 and F3 may be varied to have different orientations to produce appropriate component forces P1, P2. That is, the three outwardly sloped surfaces 33, 36, 39 mating with the cutter body may have different angles with respect to the bottom surface of the cartridge.

Figure 1:
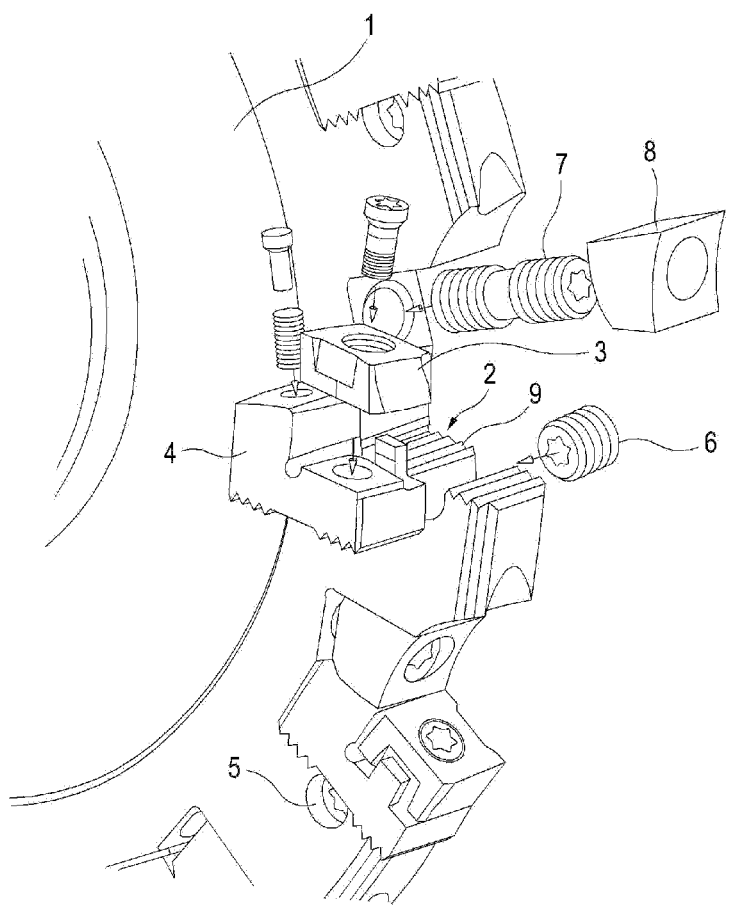
FIG. 1 illustrates a cutting tool according to the prior art.

Moreover, in the prior art shown in FIG. 1, the radial position of the cartridge becomes inconsistent after an adjustment of the cartridge due to manufacturing and assembling errors of the serrations formed in the bottom surface of the cartridge. Thus, the accuracy of the cutting operation may be deteriorated. In the present invention, however, the radially inner side surface of the cartridge closely contacts the cartridge pocket and serves as a reference surface. As such, the accuracy of the cutting operation is remarkably enhanced.

Figure 13:
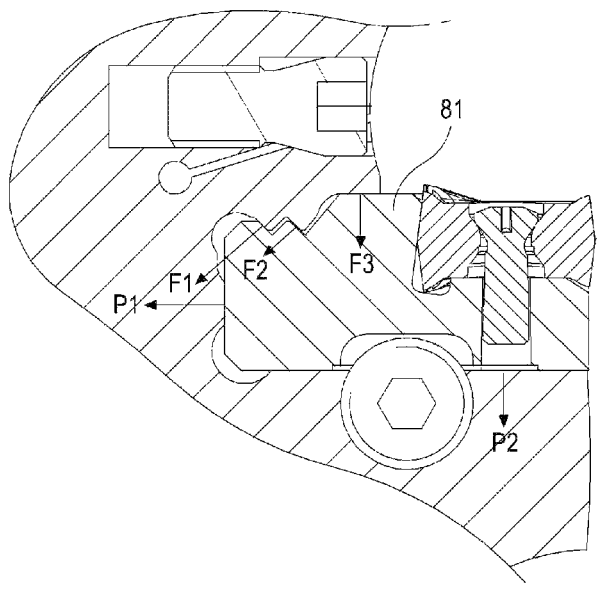
FIG. 13 shows a cross-sectional view of the cutter body according to another embodiment of the present invention.

FIG. 13 is a perspective view of the cutter body according to another embodiment of the present invention. The cartridge according to this embodiment comprises the same features as the cartridge illustrated in FIGS. 2 to 12, except the shape of the top surface of the cartridge. The cartridge according to this embodiment is characterized in that a contact surface of a first saw tooth, which is farthest away from the center of the cutter body among the saw tooth formed on the top surface of the cartridge, is parallel to the bottom surface of the cartridge. Thus, as shown in FIG. 13, the fastening force F3 acts in a direction perpendicular to the bottom surface of the cartridge. As such, a close contact to the bottom surface of the cartridge can be assured. Further, the cartridge according to this embodiment has an insert supporting wall 81, which is thicker than that of the cartridge illustrated in FIGS. 2 to 12. Accordingly, a support for the cutting insert is reinforced.

The above-described embodiments of the present invention are provided for illustrative purposes only, and are not intended to limit the present invention to specific process and features as described therein. It will be apparent to those skilled in the art that various modifications and variations may be made based on the above-described embodiments. For example, the present invention may be applicable to various machining processes to which the inventive cartridge may be employed such as drilling or turning operation, etc.

The invention claimed is:

1. A cutting tool having a direction of rotation, an axial direction and a radial direction, the cutting tool comprising:

one or more cutting portions having a cartridge and a cartridge pocket formed on a body of the cutting tool for mounting the cartridge;

said cartridge pocket including a top surface with one or more axially extending serrated projecting portions, a rear supporting surface and a bottom supporting surface generally facing in the direction of rotation;

said cartridge having an insert pocket for receiving a cutting insert, a top surface mating with said one or more axially extending serrated projecting portions of the cartridge pocket, a first side surface mating with the rear supporting surface of the cartridge pocket and a bottom surface mating with the bottom supporting surface of the cartridge pocket;

wherein the top surface of the cartridge comprises one or more radially outwardly sloped surfaces mating with said one or more axially extending serrated projecting portions of the cartridge pocket and one or more radially inwardly sloped surfaces having a gap with respect to the axially extending serrated projecting portions of the cartridge pocket, when the cartridge is mounted to the cartridge pocket.

2. The cutting tool according to claim 1, wherein a top side of the cartridge pocket comprises a threaded hole integrally formed in the cutting tool and a slot formed along the threaded hole.

3. The cutting tool according to claim 1, wherein the axially extending serrated projecting portions of the cartridge pocket comprise a first axially extending saw tooth located at the outer side of the cartridge pocket and a plurality of second axially extending saw teeth located at the inner side of the first saw tooth; and wherein at least one of the second axially extending saw teeth has a slope in the radial direction of the cutting tool which is different from that of the first saw tooth.

4. The cutting tool according to claim 3, wherein a radially inwardly sloped surface of the first axially extending saw tooth located at the top surface of the cartridge pocket forms an angle in the range of 0° to 15° with respect to the bottom supporting surface of the cartridge pocket.

5. The cutting tool according to claim 3, wherein a radially inwardly sloped surface of the second axially extending saw tooth located at the top surface of the cartridge pocket forms an angle in the range of 30° to 45° with respect to the bottom supporting surface of the cartridge pocket.

6. The cutting tool according to claim 1, wherein said bottom surface of the cartridge comprises:
a first flat surface and a second flat surface mating with the bottom supporting surface of the cartridge pocket; and
a recess located between said first and second flat surfaces.

7. The cutting tool according to claim 6, wherein a screw that can adjust the cartridge slidably is mounted in said recess.

8. The cutting tool according to claim 1, wherein said cartridge comprises:
a first supporting wall located between the top surface of the cartridge and the insert pocket for supporting the cutting insert; and
a second supporting wall located on one side of the insert pocket in an axial direction of the cutting tool.

9. A cartridge mounted in a cartridge pocket provided in a cutting tool having a direction of rotation, an axial direction and a radial direction, the cartridge comprising:
an insert pocket for mounting a cutting insert located at an outer portion of the cartridge pocket of the cutting tool;
a top surface of the cartridge facing in a first general direction and having serrated projecting portions for mating with a top surface of the cartridge pocket;

a first side surface mating with a rear supporting surface of the cartridge pocket;
a second side surface located at an outer portion of the cartridge pocket; and
a bottom surface mating with a bottom supporting surface of the cartridge pocket;
wherein the serrated projecting portions extend in the axial direction of the cutting tool;
wherein the serrated projecting portions comprise a first axially extending saw tooth located in the direction of said second side surface and a plurality of second axially extending saw teeth located between the first saw tooth and the first side surface, the second axially extending saw teeth having a slope angle in the radial direction of the cutting tool which is different from that of the first saw tooth, and
wherein the insert pocket is open to the first general direction in which the top surface faces.

10. The cartridge according to claim 9, wherein a radially outwardly sloped surface of the first axially extending saw tooth located at the top surface of the cartridge forms an angle in the range of 0° to 15° with respect to the bottom surface of the cartridge.

11. The cartridge according to claim 9, wherein an outwardly sloped surface of the second saw tooth located at the top surface of the cartridge forms an angle in the range of 30° to 45° with respect to the bottom surface of the cartridge.

12. The cartridge according to claim 9, wherein said bottom surface of the cartridge comprises:
a first flat surface and a second flat surface mating with the bottom supporting surface of the cartridge pocket; and
a recess located between said first and second flat surfaces.

13. The cartridge according to claim 9, wherein said cartridge comprises:
a first supporting wall located between the top surface of the cartridge and the insert pocket for supporting the cutting insert; and
a second supporting wall located on one side of the insert pocket in the axial direction of the cutting tool.

14. A cartridge for mounting in a cartridge pocket of a cutting tool, the cartridge comprising:
inner and outer side surfaces spaced apart from one another along a length direction of the cartridge;
first and second lateral side surfaces spaced apart from one another along a width direction of the cartridge, the first and second lateral side surfaces connecting the inner and outer side surfaces;
top and bottom surfaces connected by the inner and outer side surfaces and the first and second lateral side surfaces, the top surface facing in a first general direction;
an insert pocket formed on the top surface, proximate the outer side surface, the insert pocket opening to the first general direction in which the top surface faces; and
a plurality of serrated projecting portions formed on the top surface between the insert pocket and the inner side surface; wherein:
the plurality of serrated projecting portions are spaced apart from one another along the length direction of the cartridge; and
each of the serrated projecting portions extends in the width direction of the cartridge.

15. The cartridge according to claim 14, wherein the plurality of serrated projecting portions comprises:
a first saw tooth proximate the insert pocket; and
a second saw tooth located between the first saw tooth and the inner side surface; wherein:

the second saw tooth has a slope angle which is different from that of the first saw tooth.

16. The cartridge according to claim 14, wherein:
each of the plurality serrated projecting portions extends in the width direction of the cartridge, from the first lateral side surface to the second lateral side surface.

* * * * *